United States Patent
Bayer et al.

[11] Patent Number: 6,036,466
[45] Date of Patent: Mar. 14, 2000

[54] INJECTION MOLDING MACHINE WITH AUTOMATIC RESTART FEATURE

[75] Inventors: Alfred Michael Bayer, Rochester Hills; William August Ekrut, Plymouth; Gary Charles Legel, Northville; Ronald Charles Muir, Whitmore Lake; Robert Lloyd Crawley, Ypsilanti, all of Mich.

[73] Assignee: Ford Global Technologies, Inc., Dearborn, Mich.

[21] Appl. No.: 09/049,346

[22] Filed: Mar. 27, 1998

[51] Int. Cl.[7] ...................................................... B29C 45/78
[52] U.S. Cl. ............................ 425/144; 425/155; 425/159
[58] Field of Search ...................................... 425/155, 156, 425/157, 158, 159, 144

[56] References Cited

U.S. PATENT DOCUMENTS

| | | |
|---|---|---|
| 2,757,447 | 8/1956 | Barenyi . |
| 3,601,854 | 8/1971 | Trueblood . |
| 4,716,650 | 1/1988 | Utsui et al. . |
| 5,037,597 | 8/1991 | McGinley et al. . |
| 5,171,346 | 12/1992 | Hallett . |
| 5,525,050 | 6/1996 | Takizawa et al. ....................... 425/144 |

*Primary Examiner*—Tim Heitbrink
*Attorney, Agent, or Firm*—MacMillan, Sobanski & Todd, LLC

[57] ABSTRACT

An injection molding machine is disclosed. The machine includes a standby mode and an automatic restart mode. The machine can be programmed to automatically restart after a predetermined amount of time, with minimal effort required by a machine operator.

13 Claims, 2 Drawing Sheets

INJECTION MOLDING MACHINE WITH AUTOMATIC RESTART FEATURE

BACKGROUND OF THE INVENTION

1. Field of the Invention

The present invention relates generally to an injection molding machine. More particularly, the present invention relates to an injection molding machine having a standby mode and an automatic restart mode.

2. Disclosure Information

It is common in the fabrication industries to run injection molding machines 24 hours a day, sometimes seven days a week. The machines are stopped for only a few reasons, such as normal machine maintenance, mold maintenance or replacement or machine break down. The machine can produce many parts during this operating time, the parts typically being stored after fabrication, then transported to other locations within the same or different plant for inclusion into a greater assembly.

The storing and transporting of parts can be quite expensive. Consequently, methods have been used to reduce this cost. One method employed has been to move the injection molding machines very near to the plant location, such as an assembly line, which has the next immediate need for the produced parts. This coupling of the injection molding machine to an assembly line has minimized the excess number of parts. As such, when the assembly line is running, the injection molding machine must also be running. When the assembly line stops for whatever reason, the injection molding machine must also stop since there is no longer any storage capacity for the produced parts.

In the past, an operator stopped an injection molding machine by manually shutting off valves and material feeds to the machine. Typically, this could take approximately 10–15 minutes per machine, while starting the machine up again could be just as long. An operator usually is responsible for a large number of machines and a significant amount of time would be spent shutting down the machines and then restarting them. If an assembly line was down for a short length of time, for example an hour while the assembly line workers were at lunch, the injection molding machine operator could not shut down and restart all machines in his area in this time. This required having additional operators assist during these times, again increasing coat.

A number of proposals have been made for automatically shutting injection machines down by simply pressing a button or switch after a predetermined time or event. But there has been no teaching of restarting the machines automatically after a predetermined time. Therefore, it would be advantageous to provide an injection molding or other type of fabrication machine the ability to maintain a standby condition or mode and automatically restart after a predetermined time period has elapsed.

SUMMARY OF THE INVENTION

The present invention overcomes the problems of the prior art by providing an injection molding machine, comprising a pair of axially reciprocal mold halves, a source of cooling fluid in fluid communication with the mold halves, and a first relay electrically connected to the source of cooling fluid for controlling the flow of cooling fluid to the mold halves. The injection molding machine also includes a source of polymeric material from which the components are molded, means for feeding the polymeric material into the mold halves and a second relay electrically connected to the source of polymeric material for controlling the flow of the polymeric material into the mold halves. The machine further comprises a visual indication device for signaling the mode of operation of the machine and control means for controlling the injection molding machine. The control means comprises standby means for temporarily deactivating the first and second relays for a predetermined time period. The standby means includes delay means for automatically stopping the machine in a predetermined condition for a predetermined time period upon an operator's signal, the delay means including means for deactivating the first relay and for bringing together the mold halves. The standby means further includes restart means for automatically restarting a stopped machine after the predetermined time period upon an operator's signal and activating the first and second relays upon an operator's signal if the signal is given within the predetermined time period. The injection molding machine of the present invention can also include means for disabling the standby means after the predetermined time period lapses.

It is an advantage of the present invention that injection molding machines can be located proximate assembly lines and reduce the need for extra storage and transportation resources. The features, objects, and advantages of the present invention will become apparent from the drawings, detailed description and claims which follow.

DETAILED DESCRIPTION OF THE PREFERRED EMBODIMENTS

Figure 1:
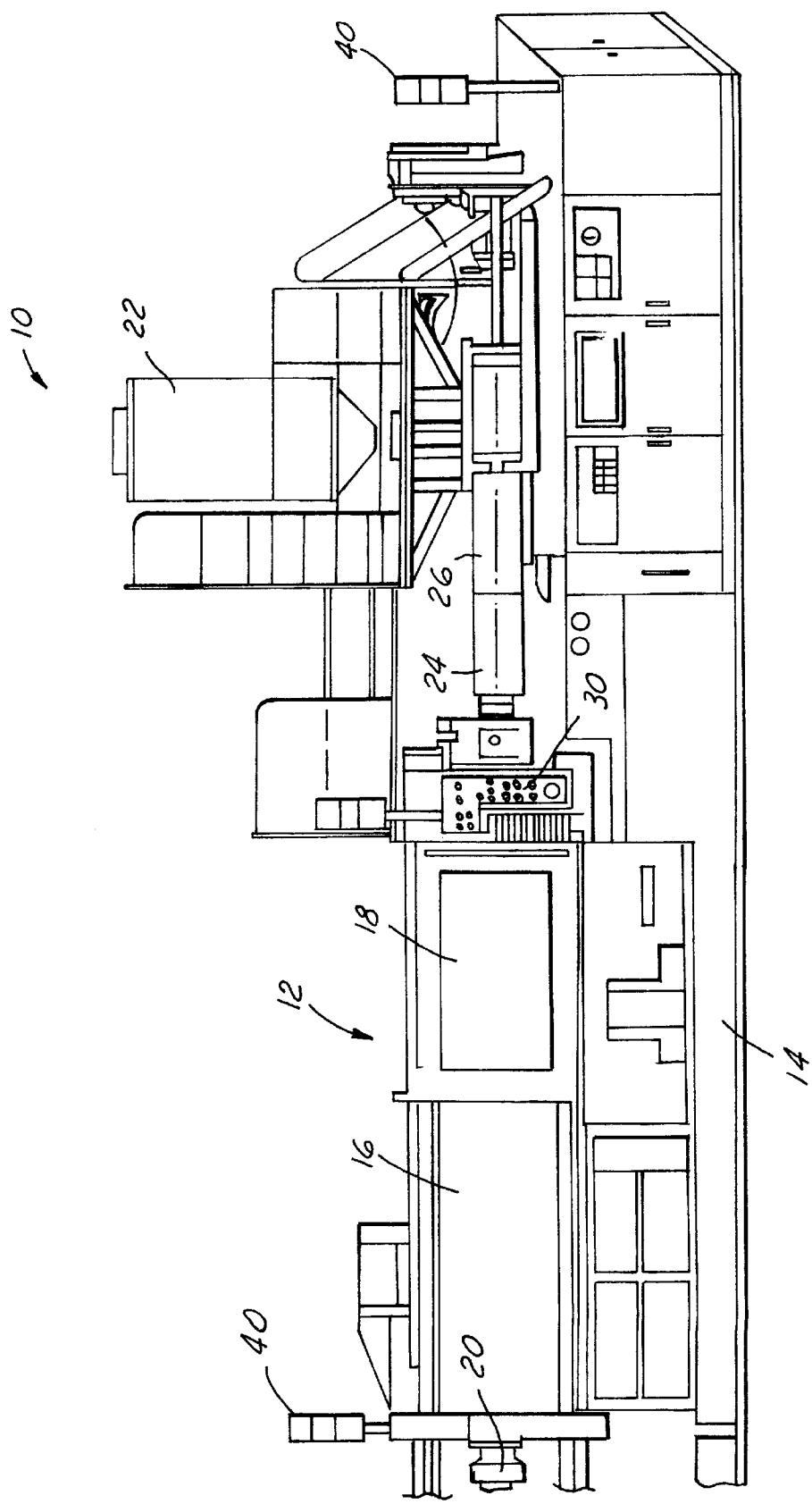
FIG. 1 is a perspective view of an injection molding machine structured in accord with the principles of the present invention.

Referring now to the drawings, FIG. 1 shows an injection molding station 10 comprising an injection molding machine 12 such as is typically used for fabricating plastic parts for variety of uses. The machine 12 includes a frame 14 surrounding the machine 12 and station 10 and a pair of mold halves 16, 18 having a predetermined mold configuration depending on the shape of the part to be molded. A clamping cylinder 20, typically hydraulically operated, is disposed at one end of the machine 12 and operates to clamp the two mold halves 16, 18 together to form a part. As is well known in the injection molding industry, a hopper 22, filled with resin or other synthetic polymeric material, feeds material to be injected into the mold halves through a plasticizing cylinder 24 and injection cylinder 26 into the mold. A screw feed mechanism is used to move the resin into the mold halves. A controller 30 runs the machine 12 according to a predetermined sequence.

Figure 3:
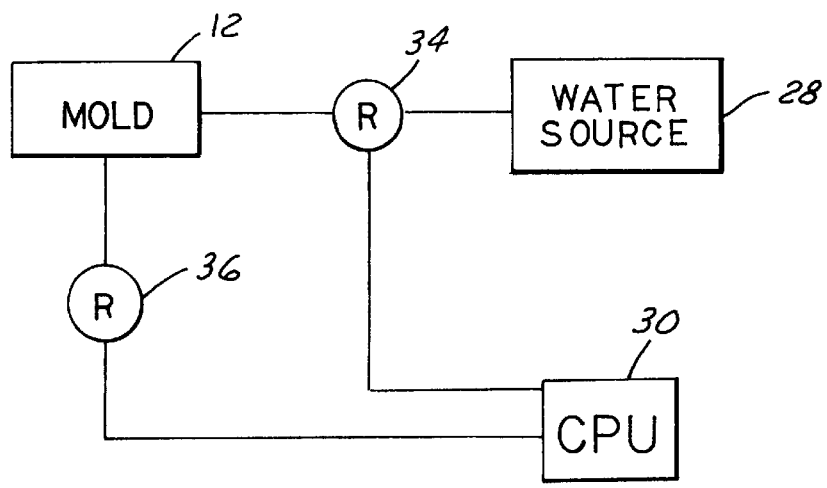
FIG. 3 is a schematic representation of a portion of the machine of FIG. 1.

In operation, the hopper 22 or other material source feeds resin into the mold halves 16, 18 which have been brought together by action of the clamping cylinder 20. Cooling lines, containing a cooling fluid such as water, are disposed throughout the mold halves to maintain the temperature of the mold to within preselected conditions. This assures that the material being molded is maintained at a proper temperature so that the material doesn't prematurely degrade and molds properly. The controller 30 receives signals from various locations within the machine to monitor the machine 12. Mold temperature and hopper balance are two such signals. The controller 30 is a conventional microcomputer including a microprocessor unit, input/output ports, read only memory, random access memory, and a conventional data bus. As shown in FIG. 3, controller 30 is shown receiving various signals from sensors coupled to the mold halves, a water or cooling fluid source and a pair of relays 34, 36 interposed between the cooling fluid source and mold halves. The significance of the relays will be discussed below.

The injection molding station 10 is located in a manufacturing plant adjacent a location where the fabricated parts are assembled into a greater component or system. In this manner, it is not necessary to fabricate a large quantity of injection molded parts, store them, then transport them some distance away to the next stage in the assembly process. But, it often occurs that the adjacent assembly line station may temporarily shut down, either due to mechanical failure or an operator planned absence, such as at meal time. When this happens, it is necessary to shut down the automatic operation of the injection molding machine 12 to avoid an overabundance of fabricated parts for which there is no longer any storage area. The present invention allows a temporary shut down of the machine with very little operator effort as will now be described.

Figure 2:
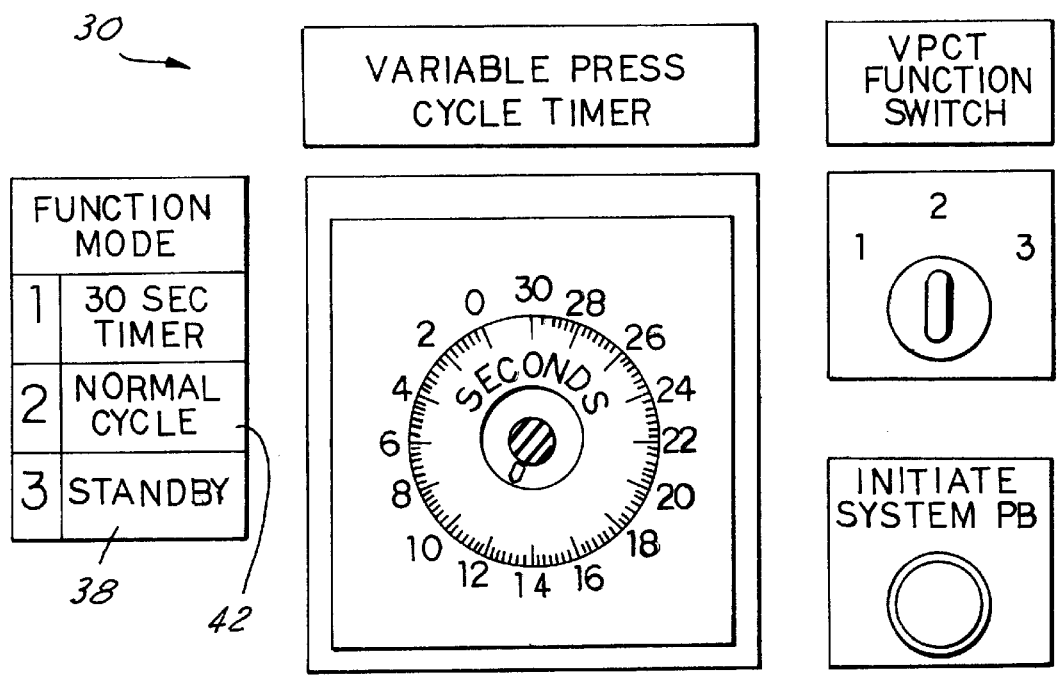
FIG. 2 is an enlarged view of a portion of the machine of FIG. 1.

As shown in FIG. 3, the controller 30 is connected to a first relay 34 interconnecting the cooling fluid source 28 to the mold halves 16, 18. The controller is further electrically connected to a second relay 36 which controls the feeding of the resin from the hopper 22 or other material source to the molds. It is critical that the mold temperature remain almost constant during the temporary shut down period because it can take a significant amount of time for the molds to be brought back up to temperature. When an operator desires to place the machine 12 into a temporary shutdown, or "standby" mode, the operator begins by pressing the appropriate "standby" button 38 on the controller interface. This is shown in FIG. 2. When this happens, the controller 30 instructs the cooling fluid relay 34 to interrupt the flow of cooling fluid to the mold halves. Similarly, the controller 30 instructs the relay 36 to interrupt the feeding of the resin into the machine 12. The controller then instructs to finish the current molding process which is running, ejecting the part when finished. The mold halves are then brought together to contact one another, not with a clamping force however. The mold halves in touching contact allow the temperature to remain almost constant for the standby period. A set of signal lights 40 located at various locations within the station signal to other plant personnel that the injection molding machine is a standby mode. This can be down by using different colored lighting schemes to indicate various operational phases of the machine.

When the machine operator returns within the predetermined time period, he again presses the appropriate "restart" or "normal cycle" button 42 at the controller interface. The controller 30 performs a diagnostic check of the system to determine whether mold temperatures are within correct range and that the hopper 22 contains resin. If these conditions are within acceptable limits, an audible alarm rings, notifying personnel nearby that the machine is beginning its normal cycling operation. The signal lights also change to an appropriate color, the mold pressure valves turn on and the molding press resumes operation. The cooling fluid will begin after the first or second operation of the molding press. The machine operator checks the molded part for quality and makes any necessary adjustment to the machine. With this design, the present invention allows the injection molding machine to be put into a standby mode for up to 70 minutes. The controller 30 also determines when this time period expires. In the event that the machine has not been restarted within this predetermined standby time period, the controller 30 will disable the machine 12, forcing an operator to resume its function manually.

Various other modifications of the present invention will, no doubt, occur to those skilled in the art. It is the following claims, including all equivalents, which define the scope of my invention.

What is claimed is:

1. An injection molding machine, comprising:
    a pair of axially reciprocable mold halves;
    a source of cooling fluid in fluid communication with said mold halves;
    a first relay electrically connected to said source of cooling fluid and operative to control a flow of said cooling fluid to said mold halves;
    a source of polymeric material;
    means for feeding said polymeric material into said mold halves;
    a second relay electrically connected to said source of polymeric material and operative to control a flow of said polymeric material into said mold halves; and
    control means for operating the injection molding machine and being connected to said first and second relays, said control means including standby means whereby actuation of said standby means controls said first and second relays in a standby mode to prevent the flow of said cooling fluid and said polymeric material to said mold halves for a predetermined standby time period, said control means permitting automatic restarting of the injection molding machine during said predetermined standby time period and preventing automatic restarting of the injection molding machine after expiration of said predetermined standby time period.

2. An injection molding machine according to claim 1, wherein said standby means automatically stops the machine in a predetermined condition upon actuation by an operator.

3. An injection molding machine according to claim 2, wherein said standby means includes restart means for automatically restarting the stopped machine during said predetermined standby time period upon an operators signal.

4. An injection molding machine according to claim 3, wherein said restart means is further operative to control said first and second relays to permit the flow of said cooling fluid and said polymeric material to said mold halves.

5. An injection molding machine according to claim 2, wherein said predetermined condition includes said mold halves being brought into contact with each other.

6. An injection molding machine according to claim 2, wherein said predetermined condition includes said mold halves being held at a constant molding temperature.

7. An injection molding machine according to claim 1, further including means for disabling said standby means after said predetermined standby time period lapses.

8. An injection molding machine according to claim 1, further including a visual indication device connected to said control means and operative to signal a mode of operation of said machine including said standby mode.

9. An injection molding machine according to claim 1, further including timer means for adjusting a cycle time of the machine.

10. An injection molding machine, comprising:
    a pair of axially reciprocable mold halves;
    a source of cooling fluid in fluid communication with said mold halves;

a first relay electrically connected to said source of cooling fluid operative to control a flow of said cooling fluid to said mold halves;

a source of polymeric material;

means for feeding said polymeric material into said mold halves;

a second relay electrically connected to said source of polymeric material operative to control a flow of said polymeric material into said mold halves;

a visual indication device operative to signal a mode of operation of the machine; and control means for operating the machine, said control means having standby means whereby actuation of said standby means controls said first and second relays in a standby mode to prevent the flow of said cooling fluid and said polymeric material to said mold halves for a predetermined standby time period, said standby means including:

delay means for automatically stopping the machine in a predetermined condition upon actuation by an operator, said delay means causing the machine to complete a current molding process and then bringing together said mold halves;

restart means for automatically restarting the stopped machine during said predetermined standby time period upon an operator's signal and activating said first and second relays; and means for disabling said standby means after said predetermined standby time period lapses.

11. An injection molding machine according to claim 10, wherein said predetermined condition includes said mold halves being held at a constant molding temperature.

12. An injection molding machine according to claim 10, further including timer means for adjusting a molding cycle time of the machine.

13. A control apparatus for activating a standby mode in an automatic fabrication machine having a plurality of cooperating systems, comprising:

control means for operating the machine, said control means including standby means for temporarily deactivating the cooperating systems for a predetermined standby time period;

delay means for automatically stopping the machine in a predetermined condition upon an operator's signal;

restart means for automatically restarting the stopped machine during said predetermined standby time period upon an operator's signal and activating the cooperating systems; and means for disabling said standby means after said predetermined standby time period lapses.

* * * * *